US012241452B2

(12) United States Patent
He et al.

(10) Patent No.: US 12,241,452 B2
(45) Date of Patent: Mar. 4, 2025

(54) SYSTEM AND METHOD FOR MONITORING ROTOR BLADE HEALTH OF A WIND TURBINE

(71) Applicant: General Electric Company, Schenectady, NY (US)

(72) Inventors: Lijun He, Schenectady, NY (US); Mohammad Attia, Niskayuna, NY (US); Biao Fang, Clifton Park, NY (US); Liwei Hao, Niskayuna, NY (US); Karim Younsi, Ballston Lake, NY (US); Honggang Wang, Clifton Park, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 17/783,356

(22) PCT Filed: Dec. 17, 2019

(86) PCT No.: PCT/US2019/066694
§ 371 (c)(1),
(2) Date: Jun. 8, 2022

(87) PCT Pub. No.: WO2021/126162
PCT Pub. Date: Jun. 24, 2021

(65) Prior Publication Data
US 2023/0011028 A1    Jan. 12, 2023

(51) Int. Cl.
*F03D 17/00* (2016.01)
*F03D 80/50* (2016.01)

(52) U.S. Cl.
CPC ............. *F03D 17/00* (2016.05); *F03D 80/50* (2016.05)

(58) Field of Classification Search
CPC ........ F03D 17/00; F03D 80/50; F03D 7/0276; F05B 2260/80; F05B 2270/80; F05B 2270/334; Y02E 10/72
See application file for complete search history.

(56) References Cited

U.S. PATENT DOCUMENTS

| 4,237,454 A | 12/1980 | Meyer |
| 5,955,880 A | 9/1999 | Beam et al. |
| (Continued) | | |

FOREIGN PATENT DOCUMENTS

| CN | 202547923 U | 11/2012 |
| CN | 104515677 A | 4/2015 |
| (Continued) | | |

OTHER PUBLICATIONS

PCT International Search Report & Opinion Corresponding to PCT/US2019/066694 on Oct. 7, 2020.

(Continued)

*Primary Examiner* — Woody A Lee, Jr.
*Assistant Examiner* — Eric A Lange
(74) *Attorney, Agent, or Firm* — Dority & Manning, P.A.

(57) ABSTRACT

A method for monitoring at least one rotor blade of a wind turbine includes implementing, via a controller, a control scheme for monitoring blade damage of the at least one rotor blade. The control scheme includes monitoring at least one electrical condition of a pitch system of the wind turbine. The method also includes converting the electrical condition(s) of the pitch system into a frequency domain. Further, the method includes determining one or more peaks of the frequency domain around a frequency component related to a natural frequency of the rotor blade. Moreover, the method includes determining a frequency deviation between the one or more peaks of the frequency domain and the frequency component related to the natural frequency of (Continued)

the rotor blade. As such, a frequency deviation outside of a predetermined frequency range is indicative of a rotor blade anomaly. Thus, the method includes implementing a control action when the frequency deviation is outside of the predetermined frequency range.

12 Claims, 11 Drawing Sheets

(56) References Cited

U.S. PATENT DOCUMENTS

| | | | |
|---|---|---|---|
| 7,086,834 B2 | 8/2006 | LeMieux | |
| 7,895,018 B2* | 2/2011 | Nies | G05B 23/0229 |
| | | | 702/188 |
| 7,954,372 B2 | 6/2011 | Brath et al. | |
| 8,043,048 B2 | 10/2011 | Daniels et al. | |
| 8,434,360 B2 | 5/2013 | Cheng | |
| 8,511,177 B1 | 8/2013 | Makaremi | |
| 8,994,359 B2 | 3/2015 | Neti et al. | |
| 9,086,048 B2 | 7/2015 | Roesmann et al. | |
| 10,371,123 B2 | 8/2019 | Kammer | |
| 11,002,250 B2 | 5/2021 | Grunnet et al. | |
| 2005/0276696 A1 | 12/2005 | LeMieux | |
| 2010/0119370 A1 | 5/2010 | Myhr | |
| 2010/0219987 A1 | 9/2010 | Isom et al. | |
| 2011/0018727 A1 | 1/2011 | Bharadwaj et al. | |
| 2011/0020122 A1 | 1/2011 | Parthasarathy et al. | |
| 2011/0158805 A1 | 6/2011 | Miranda et al. | |
| 2011/0224917 A1 | 9/2011 | Uluyol et al. | |
| 2012/0053851 A1 | 3/2012 | Baller et al. | |
| 2013/0049733 A1 | 2/2013 | Neti et al. | |
| 2013/0195657 A1* | 8/2013 | Lauritsen | F01D 25/00 |
| | | | 416/61 |
| 2013/0338938 A1 | 12/2013 | Coultate | |
| 2014/0172326 A1 | 6/2014 | Zhang et al. | |
| 2014/0260634 A1 | 9/2014 | Newman | |
| 2014/0308122 A1* | 10/2014 | Castro | F03D 7/0224 |
| | | | 416/61 |
| 2015/0050143 A1 | 2/2015 | Kammer | |
| 2015/0292486 A1* | 10/2015 | Zhou | F03D 80/40 |
| | | | 702/35 |
| 2015/0345467 A1 | 12/2015 | Kramer | |
| 2015/0354402 A1 | 12/2015 | Ehsani et al. | |
| 2015/0369698 A1 | 12/2015 | Sakaguchi et al. | |
| 2017/0328349 A1 | 11/2017 | Pan et al. | |
| 2018/0372075 A1 | 12/2018 | Muller et al. | |
| 2019/0048849 A1 | 2/2019 | Grunnet et al. | |
| 2019/0063404 A1 | 2/2019 | Baba | |
| 2019/0219032 A1 | 7/2019 | He et al. | |

FOREIGN PATENT DOCUMENTS

| | | | |
|---|---|---|---|
| CN | 105756864 A | 7/2016 | |
| CN | 102889175 B | 11/2016 | |
| CN | 107448362 A | 12/2017 | |
| CN | 109154274 A | 1/2019 | |
| DE | 10065314 A1 | 7/2002 | |
| DE | 102008046357 A1 | 3/2010 | |
| DE | 102016210755 A1 | 12/2017 | |
| EP | 2626683 B1 | 7/2014 | |
| WO | WO2009059606 A2 | 5/2009 | |
| WO | WO-2012066107 A2 * | 5/2012 | F03D 17/00 |
| WO | WO2012066107 A9 | 7/2012 | |
| WO | WO2017137050 A1 | 8/2017 | |

OTHER PUBLICATIONS

Gong et al., "Bearing Fault Detection for Direct-Drive Wind Turbines via Stator Current Spectrum Analysis", Energy Conversion Congress and Exposition (ECCE), Sep. 17-22, 2011, pp. 313-318.
Jeffries et al., Experience with Bicoherence of Electrical Power for Condition Monitoring of Wind Turbine Blades, IEE Proceedings—Vision, Image and Signal Processing, vol. 145, Issue 3, 1998, pp. 141-148, https://www.researchgate.net/publication/3359021_Experience_with_bicoherence_of_electrical_power_for_condition_monitoring_of_wind_turbine_blades.
Kandukuri et al., Fault Diagnostics for Electrically Operated Pitch Systems in Offshore Wind Turbines, Journal of Physics, vol. 753, 2016, 14 Pages.
Lu et al., A Review of Recent Advances in Wind Turbine Condition Monitoring and Fault Diagnosis, Power Electronics and Machines in Wind Applications, Jun. 24-26, 2009. (Abstract Only).
Nielsen et al., "Analysis of pitch system data for condition monitoring", Wind Energy, vol. 17, Issue: 3, Mar. 2014, pp. 435-449.
Rezamand et al., A New Hybrid Fault Detection Method for Wind Turbine Blades Using Recursive PCA and Wavelet-based PDF, IEEE Sensors Journal, vol. 20, Issue 4, 2019, pp. 2023-2033. https://ieeexplore.ieee.org/document/8879580.
Yang et al., Wind Turbine Condition Monitoring and Fault Diagnosis Using Both Mechanical and Electrical Signatures, IEEE/ASME International Conference on Advanced Intelligent Mechatronics, Jul. 2-5, 2008. (Abstract Only).
Chinese Office Action with translation, Nov. 1, 2024.

* cited by examiner

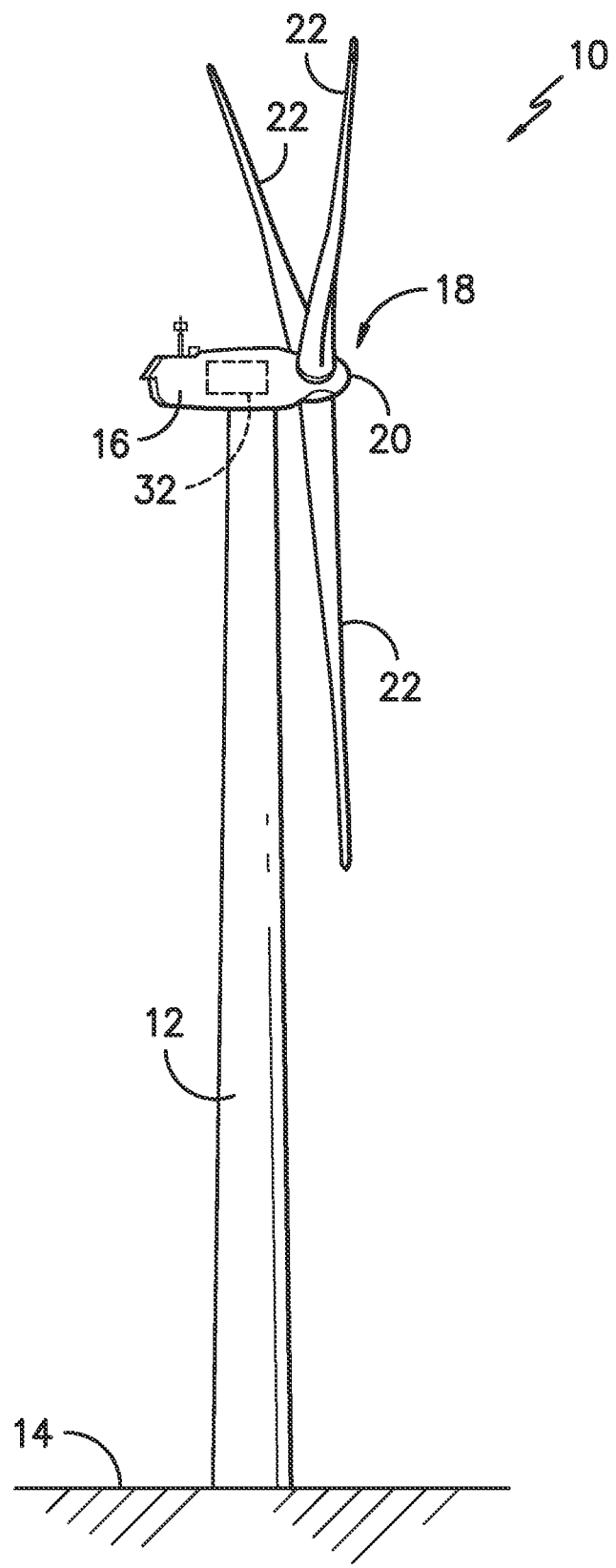
FIG. -1-

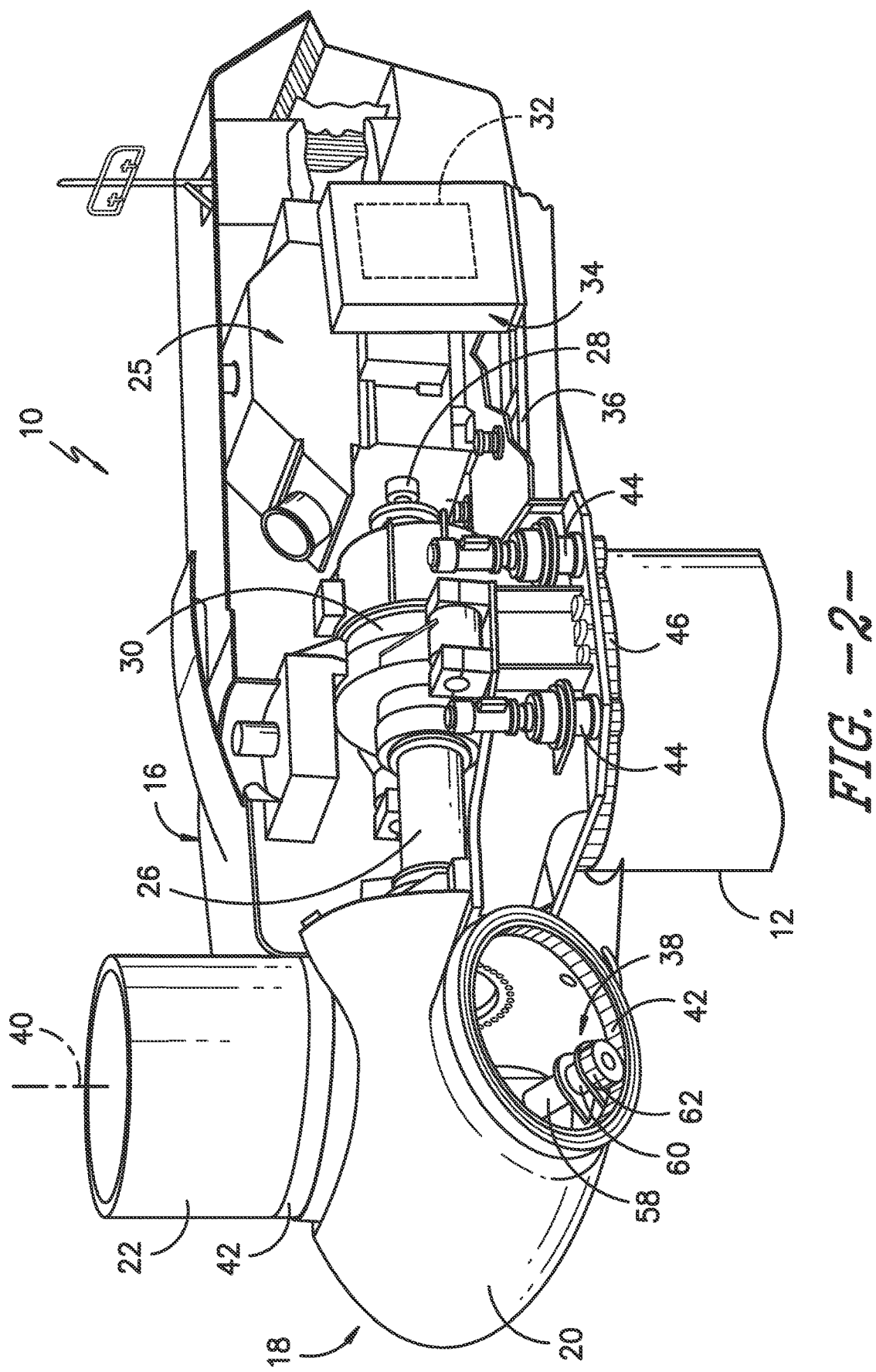
FIG. -2-

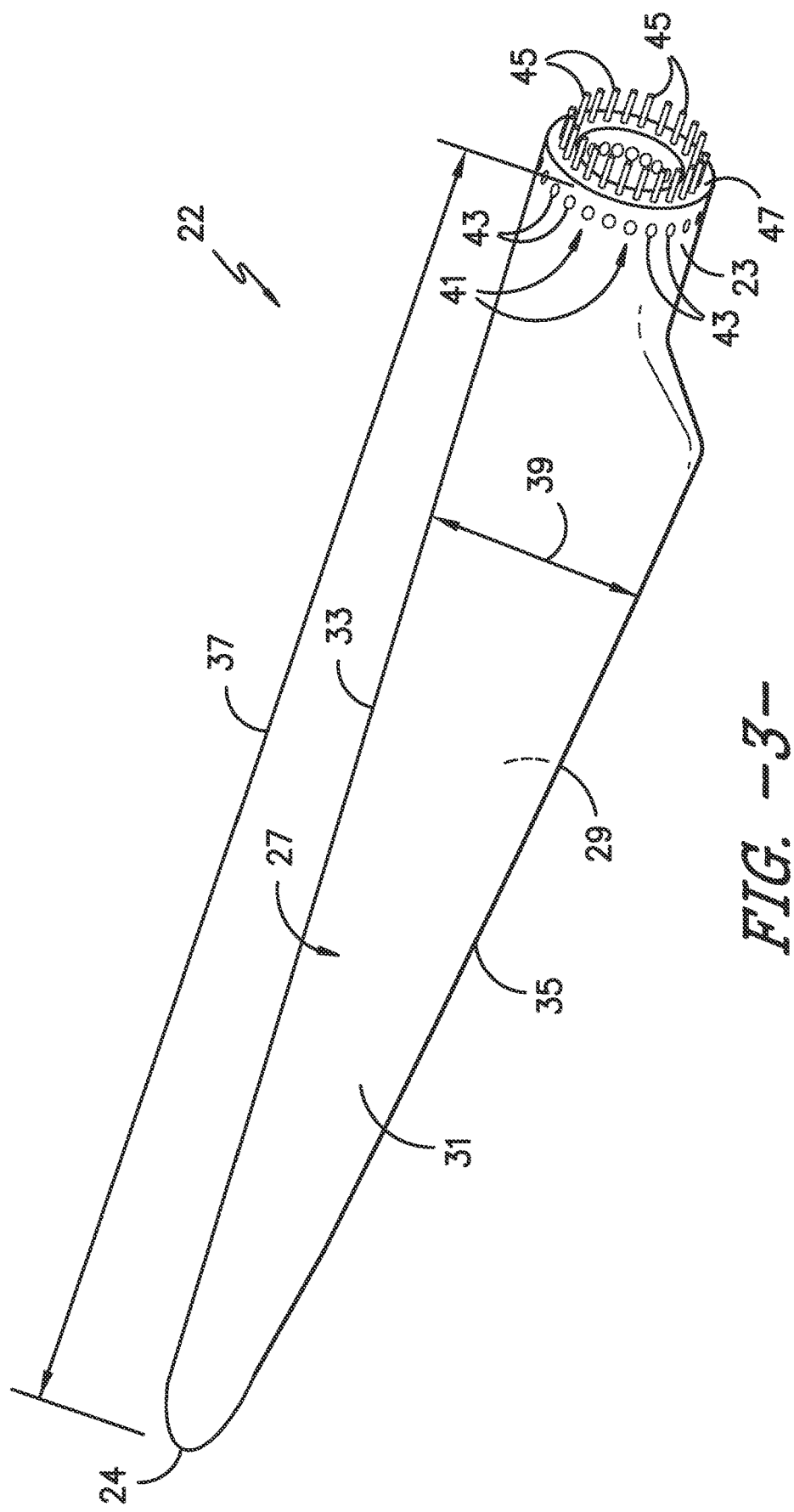
FIG. -3-

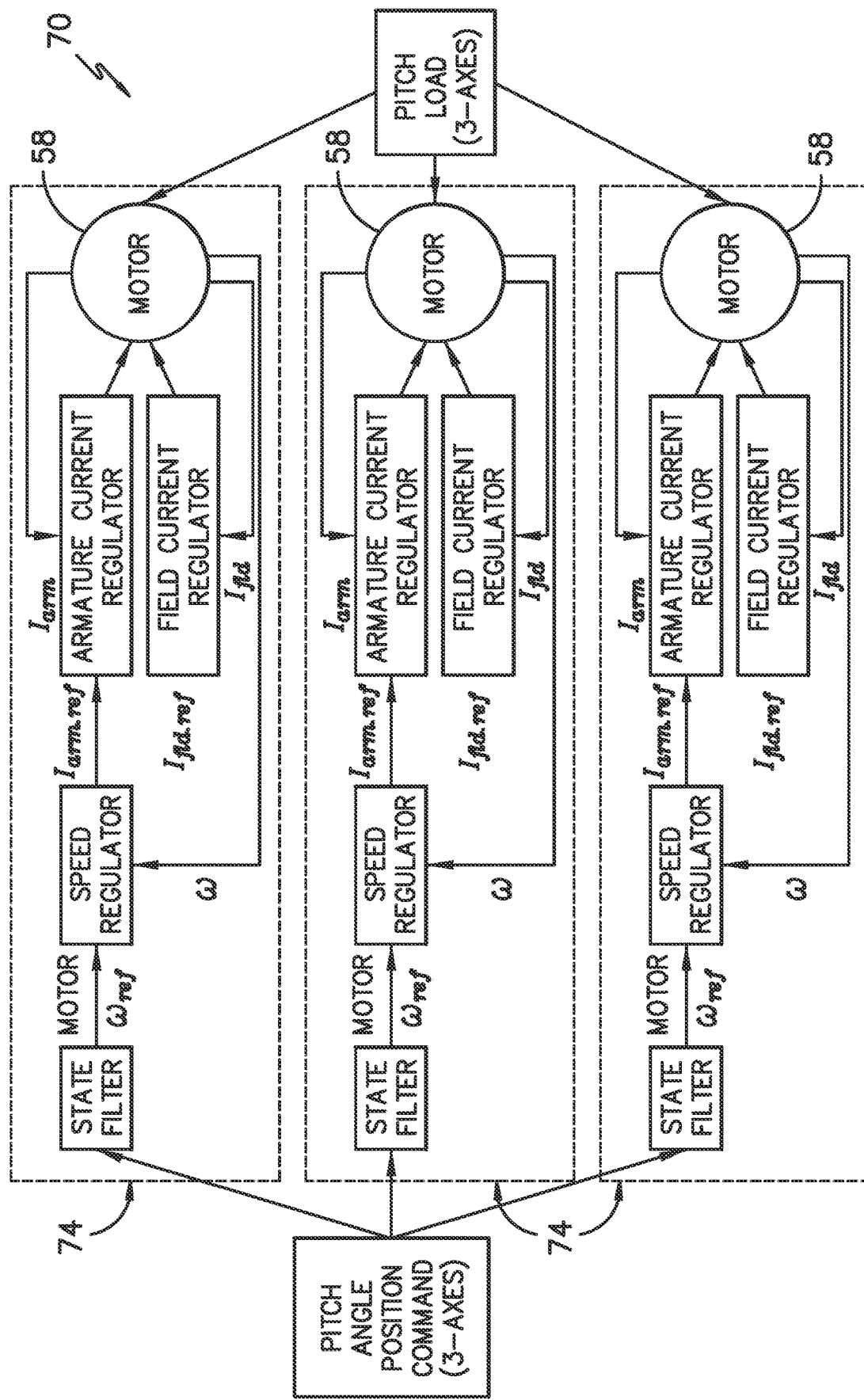
FIG. -4-

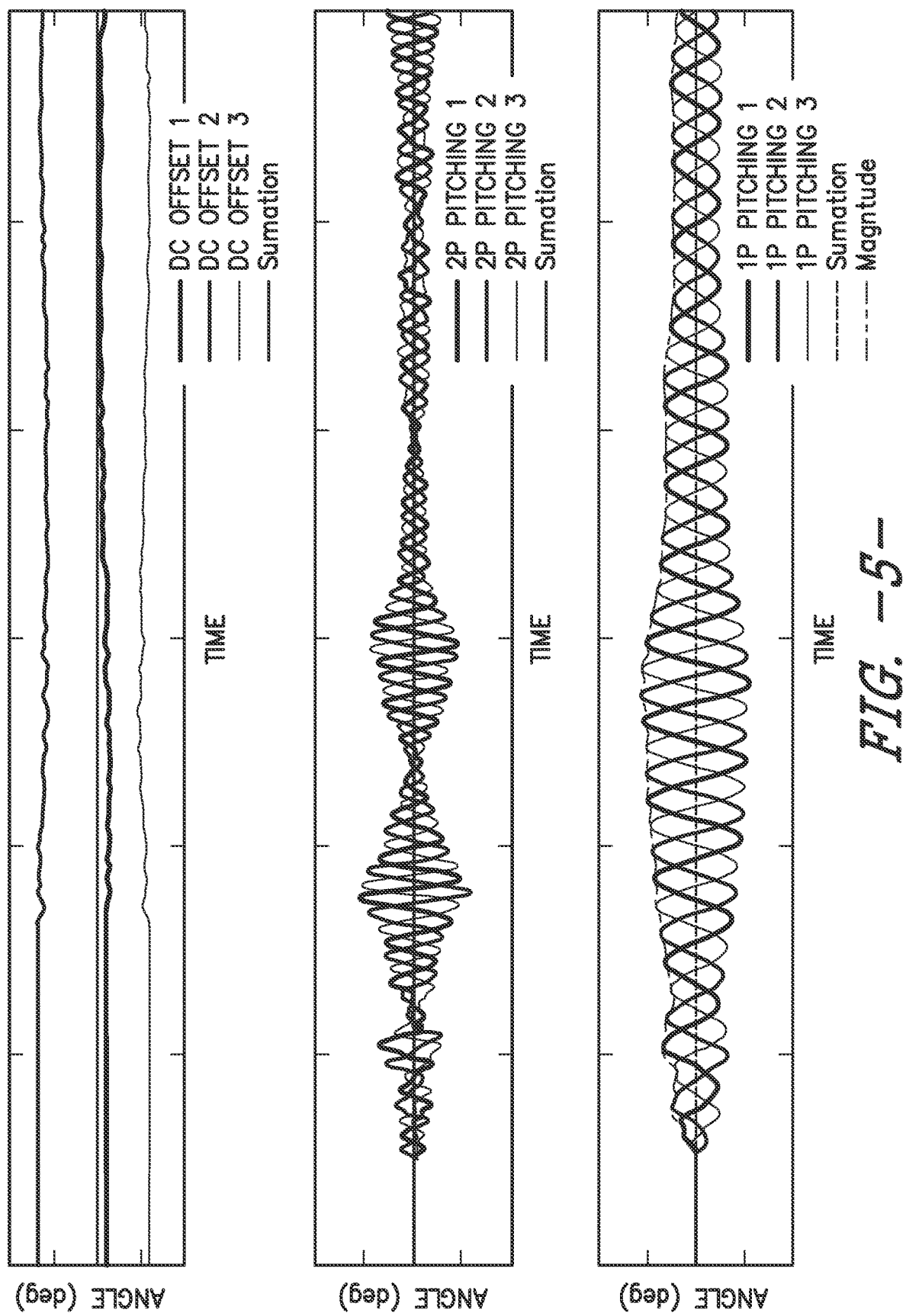
FIG. -5-

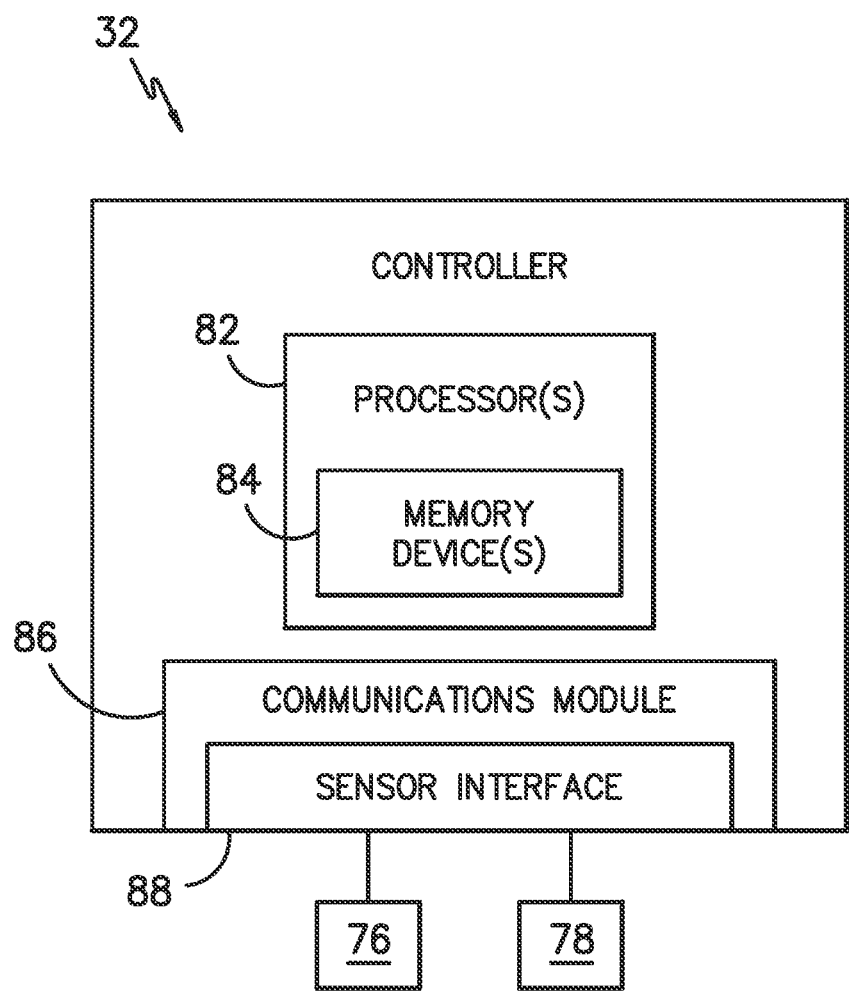
FIG. -6-

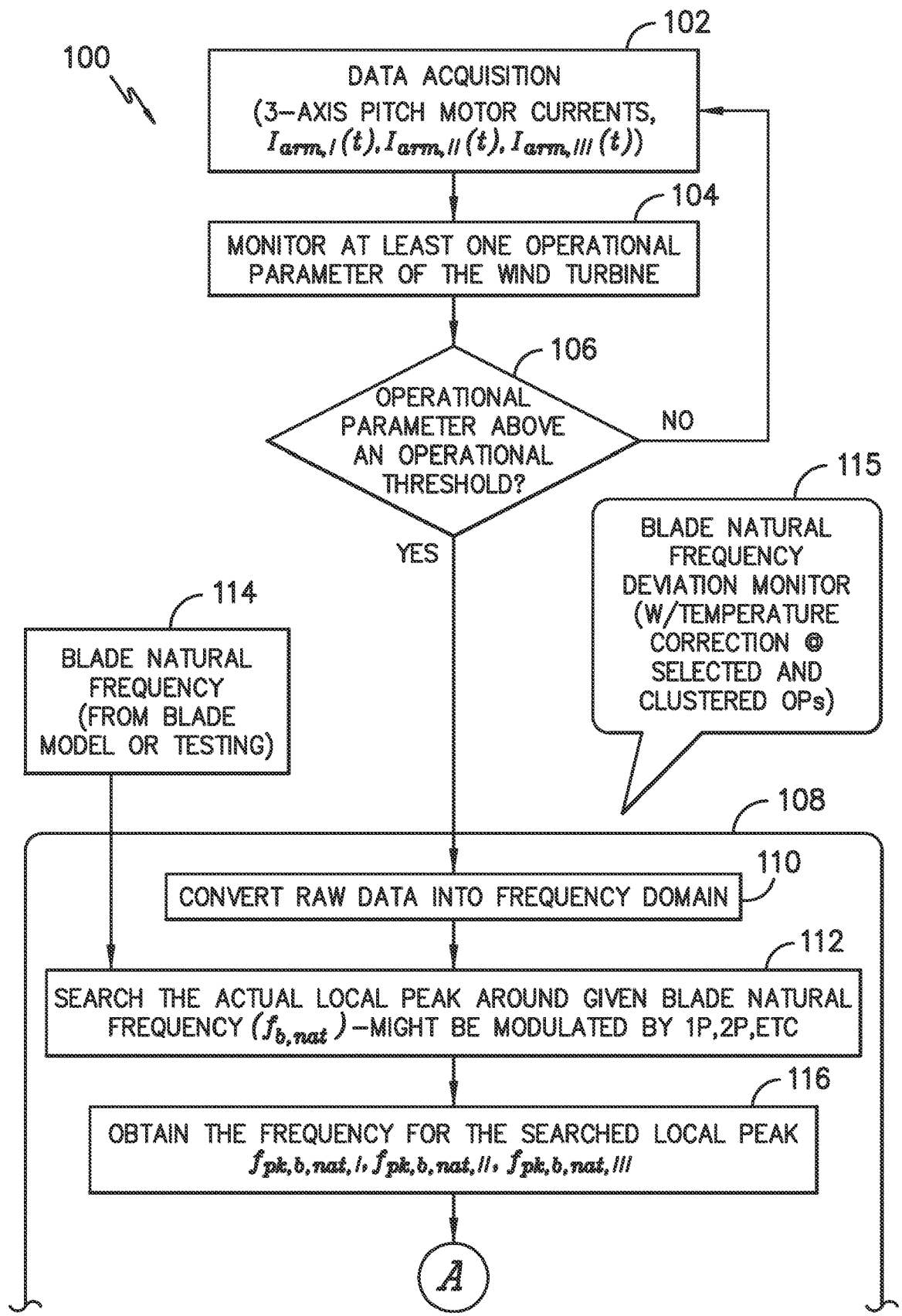
FIG. —7A—

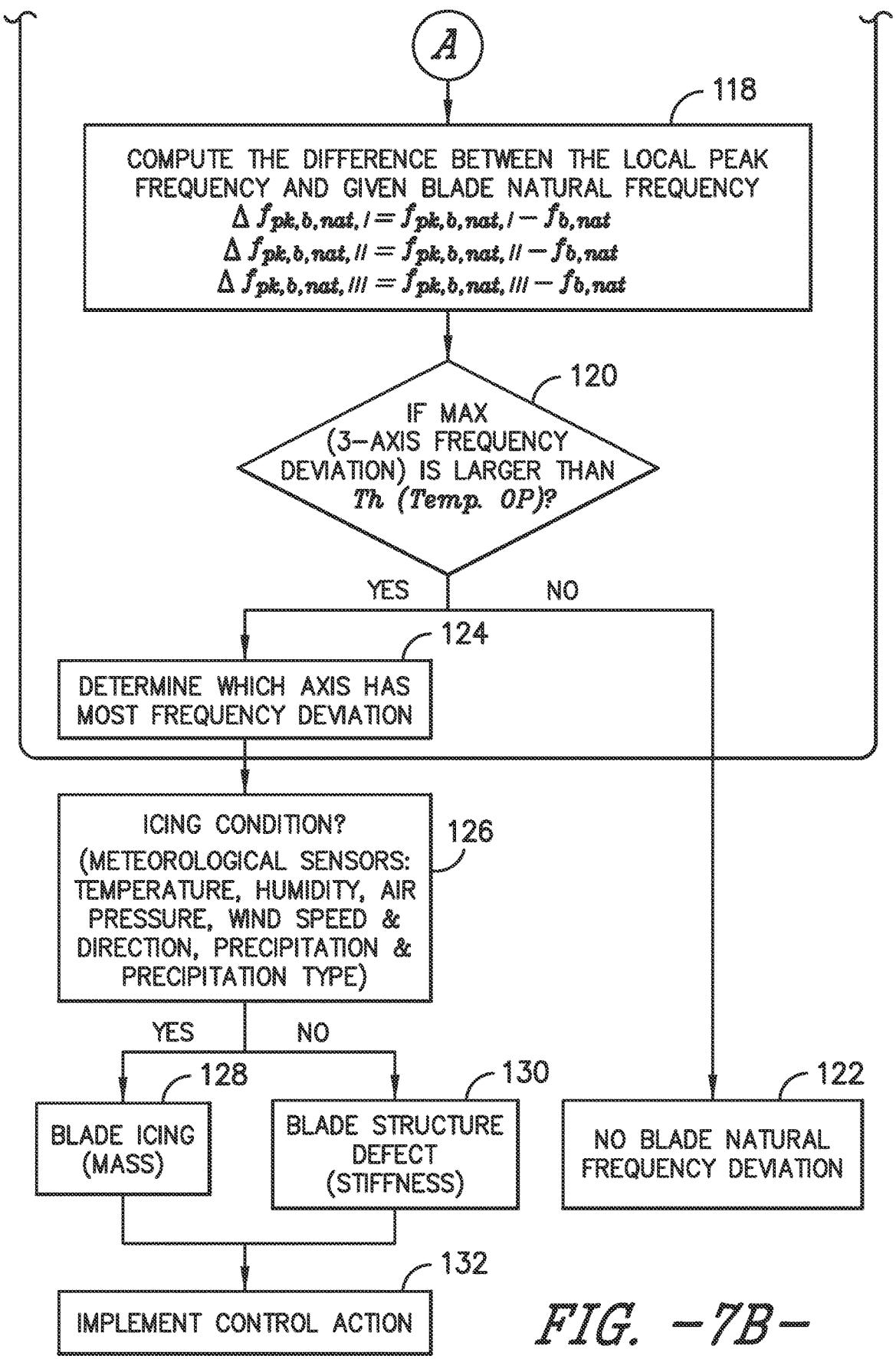
FIG. -7B-

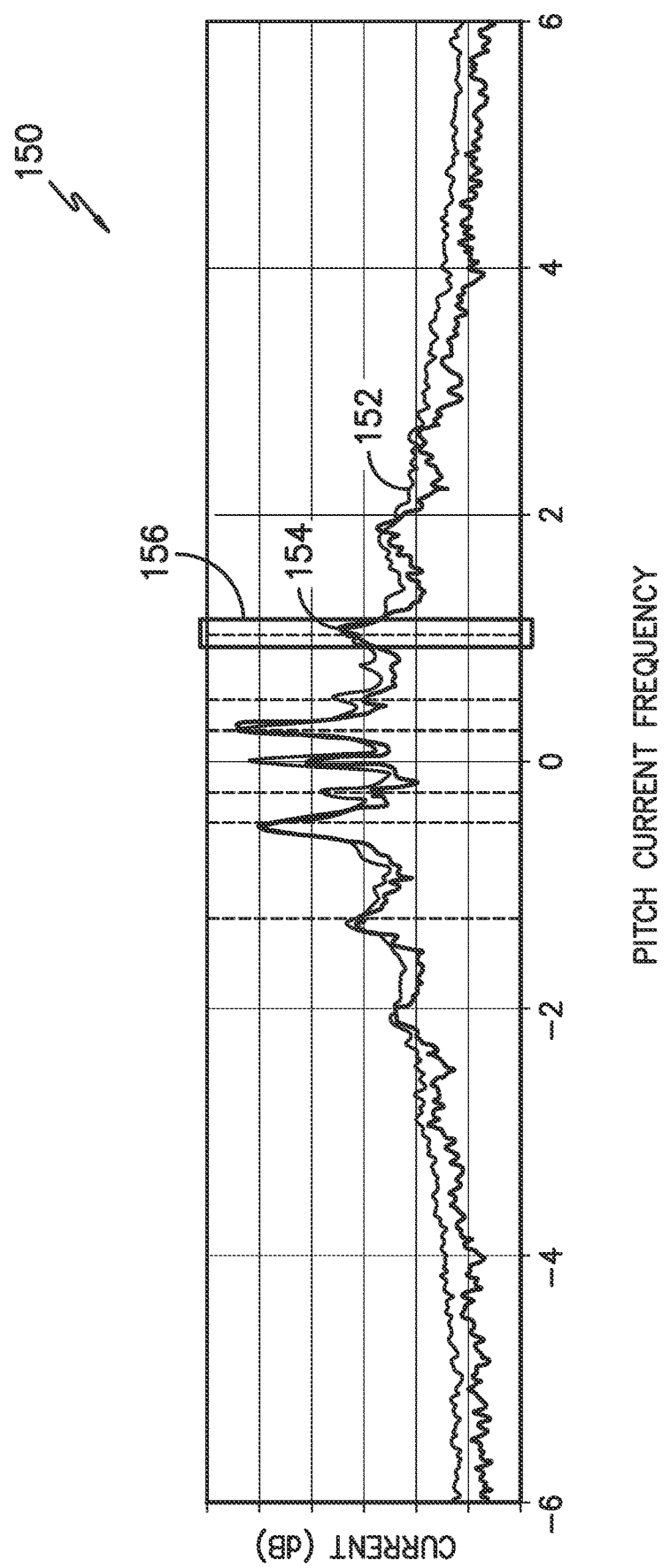
FIG. -8-

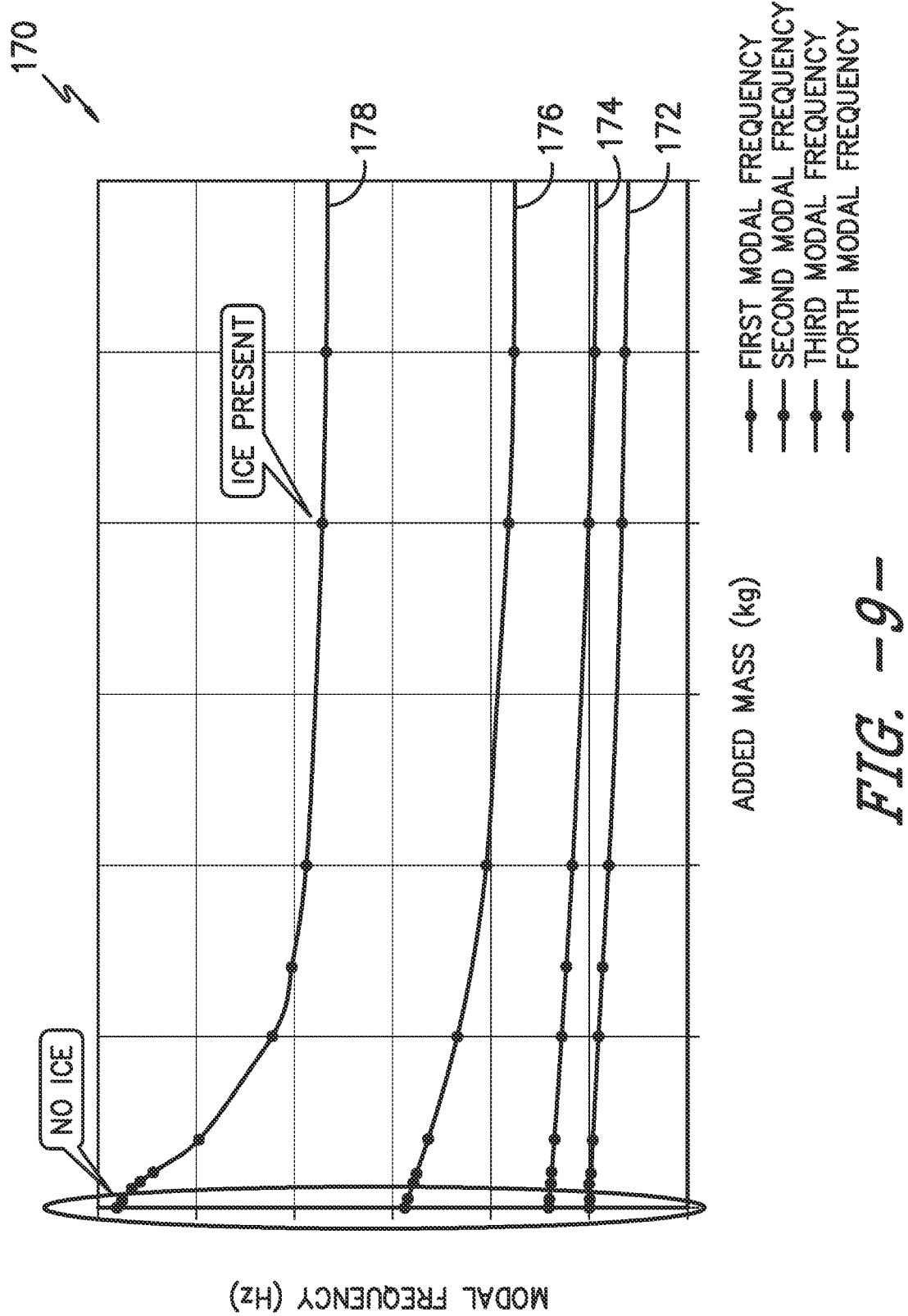
FIG. -9-

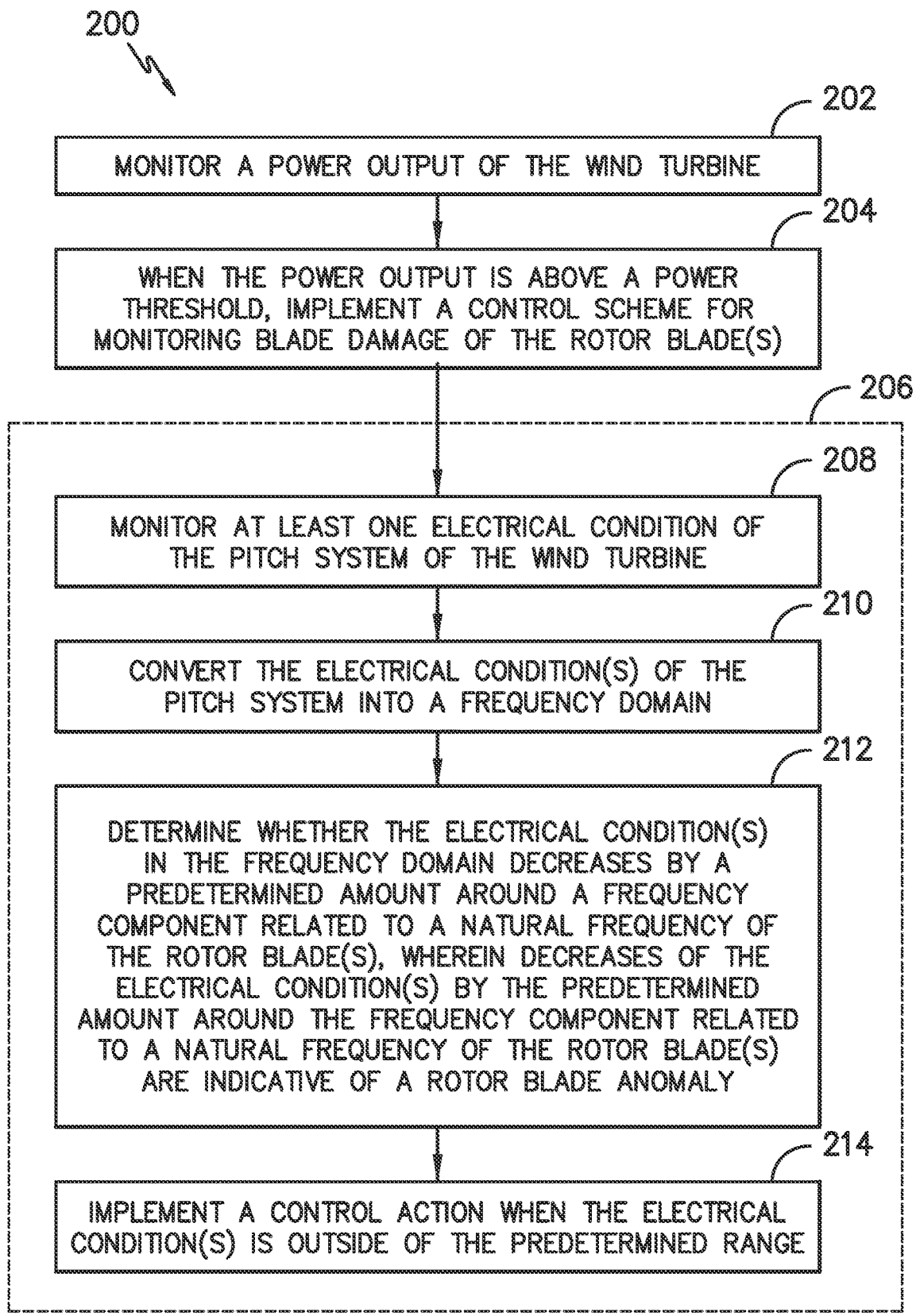
FIG. -10-

SYSTEM AND METHOD FOR MONITORING ROTOR BLADE HEALTH OF A WIND TURBINE

RELATED APPLICATIONS

The present application claims priority to PCT Application Serial Number PCT/US2019/066694, filed on Dec. 17, 2019, which is incorporated by reference herein.

FIELD

The present disclosure relates generally to wind turbines and, more particularly, to systems and methods for monitoring rotor blade health of a wind turbine, e.g. using pitch motor current.

BACKGROUND

Wind power is considered one of the cleanest, most environmentally friendly energy sources presently available, and wind turbines have gained increased attention in this regard. A modern wind turbine typically includes a tower, a generator, an optional gearbox, a nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

During operation of the wind turbine, the components thereof are subjected to various loads. If the loads exceed design thresholds, the components are at risk for damage and/or failure. For example, rotor blade damage and/or failure is a common occurrence in wind turbines that is very costly and can lead to substantial downtime. In addition, blade damage can also result in tower damage or destruction, leading to even more costs and downtime.

Currently-used market technology focuses on blade inspection, such as image capturing and drone inspection to detect blade damage. Such methods, however, cannot be used to detect hidden blade cracks. Still other methods for detecting blade damage may include fiber optic sensing or paired antennas, but such systems are very costly.

Accordingly, improved systems and methods for monitoring rotor blade health of a wind turbine with minimum hardware cost would be welcomed in the art so as to provide an early warning about the blade condition. Thus, the repair and maintenance process could be largely improved and the downtime and related losses can be minimized.

BRIEF DESCRIPTION

Aspects and advantages of the invention will be set forth in part in the following description, or may be obvious from the description, or may be learned through practice of the invention.

In one aspect, the present disclosure is directed to a method for monitoring at least one rotor blade of a wind turbine. The method includes implementing, via a controller, a control scheme for monitoring blade damage of the at least one rotor blade. The control scheme includes monitoring at least one electrical condition of a pitch system of the wind turbine. The method also includes converting the electrical condition(s) of the pitch system into a frequency domain. Further, the method includes determining one or more peaks of the frequency domain around a frequency component related to a natural frequency of the rotor blade. Moreover, the method includes determining a frequency deviation between the one or more peaks of the frequency domain and the frequency component related to the natural frequency of the rotor blade. As such, a frequency deviation outside of a predetermined frequency range is indicative of a rotor blade anomaly. Thus, the method includes implementing a control action when the frequency deviation is outside of the predetermined frequency range.

In another aspect, the present disclosure is directed to a wind turbine. The wind turbine includes a tower, a nacelle mounted atop the tower, a rotor having a rotatable hub and at least one rotor blade communicatively coupled with a pitch system, and a controller configured to perform a plurality of operations for controlling the wind turbine. For example, the plurality of operations may include implementing a control scheme for monitoring blade damage of the at least one rotor blade. The control scheme includes monitoring at least one electrical condition of the pitch system, converting the electrical condition(s) of the pitch system into a frequency domain, determining one or more peaks of the frequency domain around a frequency component related to a natural frequency of the rotor blade, determining a frequency deviation between the one or more peaks of the frequency domain and the frequency component related to the natural frequency of the rotor blade, wherein a frequency deviation outside of a predetermined frequency range is indicative of a rotor blade anomaly, and implementing a control action when the frequency deviation is outside of the predetermined frequency range. It should be understood that the wind turbine may further include any one of or combination of the features and/or embodiments as described herein.

In yet another aspect, the present disclosure is directed to a method for monitoring a rotor blade of a wind turbine. The method includes monitoring, via a controller of the wind turbine, a power output of the wind turbine. When the power output is above a power threshold, the method includes implementing, via the controller, a control scheme for monitoring blade damage of the rotor blade. The control scheme includes monitoring at least one electrical condition of a pitch system of the wind turbine, converting the at least one electrical condition of the pitch system into a frequency domain, determining, via the controller, whether the at least one electrical condition in the frequency domain decreases by a predetermined amount around a frequency component related to a natural frequency of the rotor blade, wherein decreases of the at least one electrical condition by the predetermined amount around the frequency component related to the natural frequency of the rotor blade are indicative of a rotor blade anomaly, and implementing a control action when the at least one electrical condition is outside of the predetermined range. It should be understood that the method may further include any one of combination of the features and/or embodiments as described herein.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a perspective, internal view of one embodiment of a nacelle of the wind turbine shown in FIG. 1;

FIG. 3 illustrates a perspective view of one embodiment of one of the rotor blades of the wind turbine shown in FIG. 1;

FIG. 4 illustrates a block diagram of one embodiment of a three-axis pitch system according to the present disclosure;

FIG. 5 illustrates a graph of one embodiment of pitch angle (y-axis) versus time (x-axis) for the DC offset, 1P pitching, and 2P pitching for three rotor blades during individual pitch pitching operation according to the present disclosure;

FIG. 6 illustrates a schematic diagram of one embodiment of a controller of a bearing assembly according to the present disclosure;

FIG. 7A-7B illustrate a flow diagram of one embodiment of a method for monitoring a rotor blade of a wind turbine according to the present disclosure;

FIG. 8 illustrates a graph of one embodiment of pitch current in the frequency domain according to the present disclosure;

FIG. 9 illustrates a graph of one embodiment of modal frequency (y-axis) versus added mass (x-axis) according to the present disclosure; and FIG. 10 illustrates a flow diagram of another embodiment of a method for monitoring a rotor blade of a wind turbine according to the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

For many wind turbines, when the corresponding wind-generated power is beyond a threshold, certain control algorithms are implemented to reduce the tension on the rotor blades and the tower during operation. For a wind turbine under such operation, each axis is commanded at different pitch angles at different rotor position, including 1P pitching, 2P pitching, and DC offset commands (see FIG. 5), as well as some other common offsetting terms. 1P pitching indicates the blades pitch once per revolution, while 2P pitching indicates the blades pitch twice per revolution. The command values are updated online per the real-time measurement of proximity probes installed on the wind turbines. Note that, although each blade may pitch individually with different control commands, their AC command components (e.g. 1P and 2P commands) are still balanced, with the same magnitude but shifted 120 degree. Furthermore, during such control algorithms, both commanded DC and AC components can be directly observed from measurements in the pitch drivetrain system, such as pitch motor current component, pitch speed, and pitch angle for each axis. In addition, among all AC oscillations, 1P and 2P pitching oscillations are typically the most significant since these components are externally commanded by the controller.

However, while the rotor blades are controlled under such control algorithms, there may be another AC oscillation that can be detected in the drivetrain measurements, with some being directly related to blade natural/mode frequency. Based on physics, the change of blade natural/mode frequency reflects the change of blade stiffness or mass. If there is accumulated icing on any of the rotor blades, the blade equivalent mass also increases, and the natural/mode frequency will go down. If, on the other hand, blade structure damage occurs on any of the rotor blades, the blade stiffness decreases, and the natural/mode frequency will decrease as well. Therefore, the decrease of blade natural frequency can be used as a direct indicator of blade anomaly. Additional meteorological sensors may also be used to distinguish between blade icing events and blade structure damage.

As such, the present disclosure is directed to a system and method for monitoring blade health using pitch motor current. More specifically, the present disclosure observes the blade natural/mode frequency related components in the pitch motor currents (e.g. armature current for DC motor, and torque-related current component for AC motor, e.g. q-axis current for field-oriented controlled AC motors, or direct torque measurement) to provide a blade health condition index by monitoring a natural/mode frequency deviation. Thus, the present disclosure offers early detection for wind turbine blade anomaly, e.g. blade structure damage and/or blade icing events.

Referring now to the drawings, FIG. 1 illustrates a side view of one embodiment of a wind turbine 10. As shown, the wind turbine 10 generally includes a tower 12 extending from a support surface 14 (e.g., the ground, a concrete pad or any other suitable support surface). As such, it should be understood that the wind turbine 10 described herein may be an onshore or offshore wind turbine. In addition, the wind turbine 10 may also include a nacelle 16 mounted on the tower 12 and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 25 (FIG. 2) positioned within the nacelle 16 to permit electrical energy to be produced.

Referring now to FIG. 2, a simplified, internal view of one embodiment of the nacelle 16 of the wind turbine 10 shown in FIG. 1 is illustrated. As shown, the generator 25 may be disposed within the nacelle 16 and supported atop a bedplate 36. In general, the generator 25 may be coupled to the rotor 18 for producing electrical power from the rotational energy generated by the rotor 18. For example, as shown in the illustrated embodiment, the rotor 18 may include a rotor shaft 26 coupled to the hub 20 for rotation therewith. The rotor shaft 26 may, in turn, be rotatably coupled to a generator shaft 28 of the generator 25 through a gearbox 30. As is generally understood, the rotor shaft 26 may provide a low speed, high torque input to the gearbox 30 in response to rotation of the rotor blades 22 and the hub 20. The gearbox 30 may then be configured to convert the low speed, high torque input to a high speed, low torque output to drive the generator shaft 28 and, thus, the generator 25.

The wind turbine 10 may also include a turbine controller 32 centralized within the nacelle 16. Further, as shown, the turbine controller 32 is housed within a control cabinet 34. Moreover, the turbine controller 32 may be communicatively coupled to any number of the components of the wind turbine 10 in order to control the operation of such components and/or implement various correction actions as described herein.

Referring to FIGS. 2 and 4, a typical pitch system 70 has three axis units driven by a pitch drive mechanism 38 configured to rotate each rotor blade 22 about its respective pitch axis 40 via a pitch bearing 42, thereby allowing the orientation of each blade 22 to be adjusted relative to the direction of the wind. Each pitch drive mechanism 38 includes a pitch motor 58 and regulated by its own axis controller 32 so that the rotor blades 22 can pitch individually under normal operation. It should be understood that the pitch motor 58 may be a direct current (DC) motor or an alternative current (AC) motor. Thus, when the corresponding wind generated power is beyond a threshold, individual pitch pitching control is applied to reduce the tension on the rotor blades 22 and the tower 12 during operation. For a wind turbine under individual pitch pitching control operation, as shown in FIG. 5, each axis 40 is commanded at different pitch angles at different rotor positions during individual pitch pitching operation, including 1P pitching, 2P pitching, and DC offset commands, as well as some other common offsetting terms. 1P pitching indicates that the rotor blades 22 pitch once per revolution, while 2P pitching indicates the rotor blades 22 pitch twice per revolution. The command values are updated online per the real-time measurement of the proximity probes installed on the wind turbine 10. In certain embodiments, although each rotor blade 22 is pitched individually with different loads commands, their AC command components (e.g. 1P and 2P commands) are still balanced, with the same AC magnitude but shifted 120 degrees.

Similarly, the wind turbine 10 may include one or more yaw drive mechanisms 44 communicatively coupled to the turbine controller 32, with each yaw drive mechanism(s) 44 being configured to change the angle of the nacelle 16 relative to the wind (e.g., by engaging a yaw bearing 46 of the wind turbine 10).

Referring now to FIG. 3, a perspective view of one of the rotor blades 22 shown in FIGS. 1 and 2 is illustrated in accordance with aspects of the present subject matter. As shown, the rotor blade 22 includes a blade root 23 configured for mounting the rotor blade 22 to the hub 20 and a blade tip 24 disposed opposite the blade root 23. A body 27 of the rotor blade 22 may extend lengthwise between the blade root 23 and the blade tip 24 and may generally serve as the outer shell of the rotor blade 22. As is generally understood, the body 27 may define an aerodynamic profile (e.g., by defining an airfoil shaped cross-section, such as a symmetrical or cambered airfoil-shaped cross-section) to enable the rotor blade 22 to capture kinetic energy from the wind using known aerodynamic principles. Thus, the body 27 may generally include a pressure side 29 and a suction side 31 extending between a leading edge 33 and a trailing edge 35. Additionally, the rotor blade 22 may have a span 37 defining the total length of the body 27 between the blade root 23 and the blade tip 24 and a chord 39 defining the total length of the body 27 between the leading edge 33 and the trailing edge 35. As is generally understood, the chord 39 may vary in length with respect to the span 37 as the body 27 extends from the blade root 23 to the blade tip 24.

Moreover, as shown, the rotor blade 22 may also include a plurality of T-bolts or root attachment assemblies 41 for coupling the blade root 23 to the hub 20 of the wind turbine 10. In general, each root attachment assembly 41 may include a barrel nut 43 mounted within a portion of the blade root 23 and a root bolt 45 coupled to and extending from the barrel nut 43 so as to project outwardly from a root end 47 of the blade root 23. By projecting outwardly from the root end 47, the root bolts 45 may generally be used to couple the blade root 23 to the hub 20 (e.g., via one of the pitch bearings 42).

As shown in FIG. 6, the controller 32 may include one or more processor(s) 82 and associated memory device(s) 84 configured to perform a variety of computer-implemented functions (e.g., performing the methods, steps, calculations and the like and storing relevant data as disclosed herein). Additionally, the controller 32 may also include a communications module 86 to facilitate communications between the controller 32 and various sensor(s) 76, 78. Further, the communications module 86 may include a sensor interface 88 (e.g., one or more analog-to-digital converters) to permit signals transmitted from the sensor(s) 76, 78 to be converted into signals that can be understood and processed by the processors 82. It should be appreciated that the sensor(s) 76, 78 may be communicatively coupled to the communications module 86 using any suitable means. For example, as shown in FIG. 6, the sensor(s) 76, 78 may be coupled to the sensor interface 88 via a wired connection. However, in other embodiments, the sensor(s) 76, 78 may be coupled to the sensor interface 88 via a wireless connection, such as by using any suitable wireless communications protocol known in the art. As such, the processor(s) 82 may be configured to receive one or more signals from the sensor(s) 76, 78. Further, the controller 32 and the sensor(s) 76, 78 may also be an integrated packaged product.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor(s) 82 may also be configured to compute advanced control algorithms and communicate to a variety of Ethernet or serial-based protocols (Modbus, OPC, CAN, etc.) as well as classical analog or digital signals. Additionally, the memory device(s) 84 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 84 may generally be configured to store suitable computer-readable instructions that, when implemented by the processor(s) 82, configure the controller 32 to perform the various functions as described herein.

In additional embodiments, the sensor(s) 76, 78 described herein may include any one of or combination of the following sensors: electrical sensors, meteorological sensors (such as sensors capable of measuring temperature, humidity, air pressure, wind speed and direction, precipitation, and precipitation type), a proximity sensor, an inductive sensor, a Miniature Inertial Measurement Unit (MIMU), a pressure or load sensor, an accelerometer, a Sonic Detection and Ranging (SODAR) sensor, a Light Detection and Ranging (LIDAR) sensor, an optical sensor, or similar.

Referring now to FIGS. 7A-7B, a flow diagram of one embodiment of a method 100 for monitoring at least one rotor blade 22 of the wind turbine 10 is illustrated. In some embodiments, the controller 32 is configured to perform such operations. In general, the method 100 will be described herein with reference to the wind turbine 10 and the controller 32 illustrated in FIGS. 1-6. However, it should be appreciated that the disclosed method 100 may be implemented with wind turbines having any other suitable configurations. In addition, although FIGS. 7A-7B depict steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (102), the method 100 may include a data acquisition step, whereby the controller 32 collects various electrical conditions. In other words, the controller 32 is configured to monitor at least one electrical condition of the pitch system 70. In an embodiment, the method 100 may include monitoring the electrical condition(s) of the pitch system 70 online. In addition, in such embodiments, the electrical condition(s) may include at least one of pitch motor current, pitch motor voltage, or pitch motor torque. More specifically, as shown in the illustrated embodiment, the pitch motor current may include an armature current for a DC motor (e.g. $I_{arm,I}(t)$, $I_{arm,II}(t)$, $I_{arm,III}(t)$), a torque-related current component for an AC motor, or similar or combinations thereof.

As shown at (104), the method 100 may also include monitoring at least one operational parameter of the wind turbine 10. For example, in an embodiment, the operational parameter(s) may include at least one of power output, wind speed, rotor speed, generator speed, or generator torque. As such, in an embodiment, the method 100 may only implement a blade damage control scheme 108 when the operational parameter(s) exceeds an operational threshold. In other words, the controller 32 may only implement the control scheme 108 if the power output exceeds a certain power threshold (as shown at (106)).

Accordingly, as shown at (110), the control scheme 108 may include converting the electrical condition(s) of the pitch system 70 into a frequency domain. For example, as shown in FIG. 8, a graph 150 of one embodiment of pitch motor current 152 in the frequency domain according to the present disclosure is illustrated. Thus, as shown, the control scheme 108 may include determining one or more peaks 154 of the frequency domain around a frequency component related to a natural frequency of the rotor blade(s) 22. As used herein, the frequency component related to the natural frequency of the rotor blade(s) 22 may include, as an example, a natural frequency of the rotor blade 22 directly or a natural frequency of the rotor blade(s) 22 modulated by control schemes. In addition, it should be under that the natural frequency of the rotor blade(s) 22 can by affected by temperature and/or operating conditions.

More specifically, as shown at (112), the method 100 may include searching the actual local peak around a given blade natural frequency 156 (also as shown in FIG. 7A at (114), $F_{b,nat}$), which may be modulated by 1P, 2P, etc. Thus, as shown at (116), the control scheme 108 may include obtaining the frequency for the searched local peak (e.g. $f_{pk,b,nat,I}$, $f_{pk,b,nat,II}$, $f_{pk,b,nat,III}$). As shown at (118), the control scheme 108 may include determining a frequency deviation (i.e. computing the difference) between the one or more local peaks of the frequency domain and the frequency component related to the natural frequency of the rotor blade(s) 22. For example, as shown, the frequency deviations may be calculated for each rotor blade 22 of the wind turbine 10 using Equations (1)-(3) below:

$$\Delta f_{pk,b,nat,I} = f_{pk,b,nat,I} - f_{b,nat} \qquad \text{Equation (1)}$$

$$\Delta f_{pk,b,nat,II} = f_{pk,b,nat,II} - f_{b,nat} \qquad \text{Equation (2)}$$

$$\Delta f_{pk,b,nat,III} = f_{pk,b,nat,III} - f_{b,nat} \qquad \text{Equation (3)}$$

As such, a frequency deviation outside of a predetermined frequency range may be indicative of the rotor blade being damaged or ice occurring on the rotor blade(s) 22. Furthermore, as shown at (115), the method 100 may also include monitoring for blade natural frequency-related deviation (e.g. with temperature correction at selected and clustered operating points). Thus, still referring to FIG. 7B, as shown at (120), the method 100 may then include determining whether one or more of the frequency deviations from the plurality of rotor blades 22 is larger than a frequency threshold. If not, the method 100 concludes at (122) with no blade natural frequency deviation is present. In contrast, if one or more of the frequency deviations is larger than the frequency threshold, as shown at (124), the method 100 continues by determining which of the axes has the most frequency deviation. In certain embodiments, the effect of the temperature and/or operating conditions on the natural frequency of the rotor blade(s) 22 can be monitored such that the extracted frequency deviation can be compensated by those normal operating conditions to reduce false alarms.

As shown at (126), the method 100 may also include measuring at least one environmental parameter at the wind turbine 10. In such embodiments, for example, the environmental parameter(s) at the wind turbine 10 may include, for example, at least one of temperature, humidity, pressure, wind speed, wind direction, precipitation, or combinations thereof. The reason for this measurement is that changes in the natural frequency of the rotor blade 22 reflect changes in blade stiffness or blade mass thereof. As such, when the ice accumulation is occurring on the rotor blade 22, the blade mass increases and the natural frequency of the rotor blade 22 also decreases. For example, as shown in FIG. 9, a graph 170 of one embodiment of natural/modal frequency (y-axis) versus added mass to the rotor blade 22 (x-axis) according to the present disclosure is illustrated for first, second, third, and fourth modal frequencies 172, 174, 176, 178. As shown at 0 kilograms (kg), no ice is present. However, as ice accumulates on the rotor blade 22, each of the modal frequencies 172, 174, 176, 178 decreases. In contrast, when the rotor blade 22 is damaged, the blade stiffness decreases, but the natural frequency of the rotor blade 22 also decreases. Thus, the controller 32 can determine whether ice accumulation is occurring on the rotor blade(s) 22 based on the environmental parameter(s).

Referring back to FIG. 7B, if ice accumulation is present, as shown at (128) and (132), the method 100 may include implementing a control action when the frequency deviation is outside of the predetermined frequency range. Similarly, as shown at (130) and (132), if the blade is damaged (or any other anomaly exists in the frequency deviation(s)), the method 100 may also include implementing a control action when the frequency deviation is outside of the predetermined frequency range. In several embodiments, the control action may include, for example, generating an alarm, scheduling a maintenance action, pitching one or more of the rotor blades 22, shutting down the rotor blade, derating the wind turbine 10, uprating the wind turbine 10, de-icing (e.g. heating up) the rotor blades 22, or replacing one or more of the rotor blades 22.

Referring now to FIG. 10, a flow diagram of one embodiment of a method 200 for monitoring a rotor blade 22 of the wind turbine 10 is illustrated. In some embodiments, the controller 32 is configured to perform such operations. In general, the method 200 will be described herein with reference to the wind turbine 10 and the controller 32 illustrated in FIGS. 1-6. However, it should be appreciated that the disclosed method 200 may be implemented with wind turbines having any other suitable configurations. In addition, although FIG. 10 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (202), the method 200 may include monitoring a power output of the wind turbine 10. When the power output is above a power threshold, as shown at (204), the method 200 includes implementing a control scheme 206 for monitoring blade damage of the rotor blade(s) 22. As shown at (208), the control scheme 206 may include monitoring at least one electrical condition of the pitch system 70 of the wind turbine 10 (such as any of the electrical conditions described herein). As shown at (210), the method 200 may include converting the electrical condition(s) of the pitch system 70 into a frequency domain. As shown at (212), the method 200 may include determining whether the electrical condition(s) in the frequency domain decreases by a predetermined amount around a frequency component related to a natural frequency of the rotor blade(s) 22, wherein decreases of the electrical condition(s) by the predetermined amount around the frequency component related to the natural frequency of the rotor blade(s) 22 are indicative of a rotor blade anomaly, such as blade damage or blade icing. As shown at (214), the method 200 may include implementing a control action when the electrical condition(s) is outside of the predetermined range.

Further aspects of the invention are provided by the subject matter of the following clauses:

Clause 1. A method for monitoring at least one rotor blade of a wind turbine, the method comprising:
implementing, via a controller, a control scheme for monitoring blade damage of the at least one rotor blade, the control scheme comprising:
monitoring at least one electrical condition of a pitch system of the wind turbine;
converting the at least one electrical condition of the pitch system into a frequency domain;
determining one or more peaks of the frequency domain around a frequency component related to a natural frequency of the rotor blade;
determining a frequency deviation between the one or more peaks of the frequency domain and the frequency component related to the natural frequency of the rotor blade, wherein a frequency deviation outside of a predetermined frequency range is indicative of a rotor blade anomaly; and,
implementing a control action when the frequency deviation is outside of the predetermined frequency range.

Clause 2. The method of clause 1, further comprising monitoring at least one operational parameter of the wind turbine and only implementing the control scheme when the at least one operational parameter exceeds an operational threshold.

Clause 3. The method of clause 2, wherein the at least one operational parameter comprises at least one of power output, wind speed, rotor speed, generator speed, or generator torque.

Clause 4. The method of any of the preceding clauses, wherein the at least one electrical condition comprises at least one of pitch motor current, pitch motor voltage, or pitch motor torque.

Clause 5. The method of clause 4, wherein the pitch motor current comprises one or more of an armature current for a DC motor or a torque-related current component for an AC motor.

Clause 6. The method of any of the preceding clauses, further comprising measuring at least one environmental parameter at the wind turbine and determining whether ice accumulation is occurring on the rotor blade based on the at least one environmental parameter.

Clause 7. The method of clause 6, wherein the at least one environmental parameter at the wind turbine comprises at least one of temperature, humidity, pressure, wind speed, wind direction, precipitation, or combinations thereof.

Clause 8. The method of clause 6, wherein changes in the natural frequency of the rotor blade reflect changes in blade stiffness or blade mass of the rotor blade, and wherein, when the ice accumulation is occurring on the rotor blade, the blade mass increases and the natural frequency of the rotor blade decreases, and wherein, when the rotor blade is damaged, the blade stiffness decreases and the natural frequency of the rotor blade decreases.

Clause 9. The method of any of the preceding clauses, further comprising monitoring the at least one electrical condition of the pitch system of the wind turbine online.

Clause 10. The method of any of the preceding clauses, further comprising:
implementing the control scheme for a plurality of rotor blades of the wind turbine so as to determine a frequency deviation for each of the plurality of rotor blades; and,
implementing the control action when one or more of the frequency deviations of the plurality of rotor blades is greater than a frequency threshold.

Clause 11. The method of any of the preceding clauses, wherein the control action further comprises generating an alarm, scheduling a maintenance action, pitching the rotor blade, shutting down the rotor blade, derating the wind turbine, uprating the wind turbine, de-icing the rotor blades, or replacing the rotor blade.

Clause 12. A wind turbine, comprising:
a tower;
a nacelle mounted atop the tower;
a rotor comprising a rotatable hub and at least one rotor blade communicatively coupled with a pitch system; and
a controller configured to perform a plurality of operations for controlling the wind turbine, the plurality of operations comprising:
implementing a control scheme for monitoring blade damage of the at least one rotor blade, the control scheme comprising:
monitoring at least one electrical condition of the pitch system;

converting the at least one electrical condition of the pitch system into a frequency domain;

determining one or more peaks of the frequency domain around a frequency component related to a natural frequency of the rotor blade;

determining a frequency deviation between the one or more peaks of the frequency domain and the frequency component related to the natural frequency of the rotor blade, wherein a frequency deviation outside of a predetermined frequency range is indicative of a rotor blade anomaly; and, implementing a control action when the frequency deviation is outside of the predetermined frequency range.

Clause 13. The wind turbine of clause 12, wherein the plurality of operations further comprise monitoring at least one operational parameter of the wind turbine and only implementing the control scheme when the at least one operational parameter exceeds an operational threshold, the at least one operational parameter comprising at least one of power output, wind speed, rotor speed, generator speed, or generator torque.

Clause 14. The wind turbine of clauses 12-13, wherein the at least one electrical condition comprises at least one of pitch motor current, pitch motor voltage, or pitch motor torque, and wherein the pitch motor current comprises one or more of an armature current for a DC motor or a torque-related current component for an AC motor.

Clause 15. The wind turbine of clauses 12-14, further comprising at least one sensor for measuring at least one environmental parameter at the wind turbine, the plurality of operations further comprising determining whether ice accumulation is occurring on the rotor blade based on the at least one environmental parameter.

Clause 16. The wind turbine of clause 15, wherein the at least one environmental parameter at the wind turbine comprises at least one of temperature, humidity, pressure, wind speed, wind direction, precipitation, or combinations thereof.

Clause 17. The wind turbine of clause 15, wherein changes in the natural frequency of the rotor blade reflect changes in blade stiffness or blade mass of the rotor blade, and wherein, when the ice accumulation is occurring on the rotor blade, the blade mass increases and the natural frequency of the rotor blade decreases, and wherein, when the rotor blade is damaged, the blade stiffness decreases and the natural frequency of the rotor blade decreases.

Clause 18. The wind turbine of clauses 12-17, wherein the plurality of operations further comprise monitoring the at least one electrical condition of the pitch wind turbine of the rotor blade online.

Clause 19. The wind turbine of clauses 12-18, wherein the control action further comprises generating an alarm, scheduling a maintenance action, pitching the rotor blade, shutting down the rotor blade, derating the wind turbine, uprating the wind turbine, de-icing the rotor blades, or replacing the rotor blade.

Clause 20. A method for monitoring a rotor blade of a wind turbine, the method comprising:

monitoring, via a controller of the wind turbine, a power output of the wind turbine;

when the power output is above a power threshold, implementing, via the controller, a control scheme for monitoring blade damage of the rotor blade, the control scheme comprising:

monitoring at least one electrical condition of a pitch system of the wind turbine;

converting the at least one electrical condition of the pitch system into a frequency domain;

determining, via the controller, whether the at least one electrical condition in the frequency domain decreases by a predetermined amount around a frequency component related to a natural frequency of the rotor blade, wherein decreases of the at least one electrical condition by the predetermined amount around the frequency component related to the natural frequency of the rotor blade are indicative of a rotor blade anomaly; and, implementing a control action when the at least one electrical condition is outside of the predetermined range.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for monitoring at least one rotor blade of a wind turbine, the method comprising:

implementing, via a controller, a control scheme for monitoring blade damage of the at least one rotor blade, the control scheme comprising:

monitoring pitch motor current of a pitch system of the wind turbine;

converting the pitch motor current of the pitch system into a frequency domain;

monitoring one or more blade natural frequency-related components in the frequency domain of the pitch motor current for a local peak, the one or more blade natural frequency-related components comprising an armature current for a DC motor and a torque-related current component for an AC motor;

determining a natural frequency deviation by determining a difference between the local peak and a given natural frequency of the rotor blade, wherein a natural frequency deviation outside of a predetermined frequency range is indicative of a rotor blade anomaly; and implementing a control action when the natural frequency deviation is outside of the predetermined frequency range.

2. The method of claim 1, further comprising monitoring at least one operational parameter of the wind turbine and only implementing the control scheme when the at least one operational parameter exceeds an operational threshold.

3. The method of claim 2, wherein the at least one operational parameter comprises at least one of power output, wind speed, rotor speed, generator speed, or generator torque.

4. The method of claim 1, further comprising determining whether ice accumulation is occurring on the rotor blade based on one or more environmental parameters.

5. The method of claim 4, wherein the one or more environmental parameters at the wind turbine comprises at least one of temperature, humidity, pressure, wind speed, wind direction, precipitation, or combinations thereof.

6. The method of claim 1, further comprising:
implementing the control scheme for a plurality of rotor blades of the wind turbine so as to determine a frequency deviation for each of the plurality of rotor blades; and
implementing the control action when one or more of the frequency deviations of the plurality of rotor blades is greater than a frequency threshold.

7. The method of claim 1, wherein the control action further comprises generating an alarm, scheduling a maintenance action, pitching the rotor blade, shutting down the rotor blade, derating the wind turbine, uprating the wind turbine, de-icing the rotor blades, or replacing the rotor blade.

8. A wind turbine, comprising:
a tower;
a nacelle mounted atop the tower;
a rotor comprising a rotatable hub and at least one rotor blade communicatively coupled with a pitch system; and
a controller configured to perform a plurality of operations for controlling the wind turbine, the plurality of operations comprising:
implementing a control scheme for monitoring blade damage of the at least one rotor blade, the control scheme comprising:
monitoring pitch motor current of the pitch system;
converting the pitch motor current of the pitch system into a frequency domain;
monitoring one or more blade natural frequency-related components in the frequency domain of the pitch motor current for a local peak, the one or more blade natural frequency-related components comprising an armature current for a DC motor and a torque-related current component for an AC motor;
determining a natural frequency deviation by determining a difference between the local peak and a given natural frequency of the rotor blade, wherein a natural frequency deviation outside of a predetermined frequency range is indicative of a rotor blade anomaly; and
implementing a control action when the natural frequency deviation is outside of the predetermined frequency range.

9. The wind turbine of claim 8, wherein the plurality of operations further comprise monitoring at least one operational parameter of the wind turbine and only implementing the control scheme when the at least one operational parameter exceeds an operational threshold, the at least one operational parameter comprising at least one of power output, wind speed, rotor speed, generator speed, or generator torque.

10. The wind turbine of claim 8, further comprising at least one sensor for measuring the environmental parameter, the plurality of operations further comprising determining whether ice accumulation is occurring on the rotor blade based on the environmental parameter.

11. The wind turbine of claim 10, wherein the environmental parameter comprises at least one of temperature, humidity, pressure, wind speed, wind direction, precipitation, or combinations thereof.

12. The wind turbine of claim 8, wherein the control action further comprises generating an alarm, scheduling a maintenance action, pitching the rotor blade, shutting down the rotor blade, derating the wind turbine, uprating the wind turbine, de-icing the rotor blades, or replacing the rotor blade.

* * * * *